United States Patent [19]

Bouvot

[11] Patent Number: 4,767,096

[45] Date of Patent: * Aug. 30, 1988

[54] DEVICE FOR CONTROLLING DISPLACEMENT OF A MOVING MEMBER, SUCH AS A FLAP IN AN INSTALLATION FOR HEATING AND VENTILATING OR FOR AIR CONDITIONING A MOTOR VEHICLE

[75] Inventor: Jean-François Bouvot, Dampierre, France

[73] Assignee: VALEO, Societe anonyme francaise, Paris, France

[ * ] Notice: The portion of the term of this patent subsequent to May 19, 2004 has been disclaimed.

[21] Appl. No.: 10,454

[22] Filed: Feb. 3, 1987

[30] Foreign Application Priority Data

Feb. 4, 1986 [FR] France ................... 86 01522

[51] Int. Cl.⁴ .............. F16N 31/124; F15B 9/10; F16K 49/00
[52] U.S. Cl. ................... 251/25; 91/375 R; 91/376 R; 98/2; 137/625.21
[58] Field of Search ............ 91/375 R, 186, 376 R, 91/381; 137/625.21, 865, 334; 98/2, 40.3; 251/25

[56] References Cited

U.S. PATENT DOCUMENTS

| 2,490,509 | 12/1949 | Carleton | 137/887 |
| 3,254,674 | 6/1966 | Leask | 137/625.23 |
| 3,731,729 | 5/1973 | Beatenbough et al. | 137/625.21 |
| 4,665,799 | 5/1987 | Bouvot | 91/376 R |

FOREIGN PATENT DOCUMENTS

| 0182686 | 5/1986 | European Pat. Off. . | |
| 2536124 | 5/1984 | France | 251/58 |
| 2553858 | 4/1985 | France . | |

Primary Examiner—George L. Walton
Attorney, Agent, or Firm—Dennison, Meserole, Pollack & Scheiner

[57] ABSTRACT

A device for controlling the displacement of a moving member by means of of a fluid distributor connecting a single-acting actuator for displacing the moving member to a source of fluid under pressure and to an exhaust, wherein the fluid distributor comprises a fixed element (68) having hoses providing fluid connections to the actuator, to the source of fluid under pressure, and to the exhaust, a moving element (64) constrained to be displaced by manually-operated control means, and a moving element (66) constrained to move with the moving member or the piston rod of its actuator. The invention is particularly applicable to controlling the displacement of flaps in an installation for heating and ventilating or for air conditioning a motor vehicle.

11 Claims, 6 Drawing Sheets

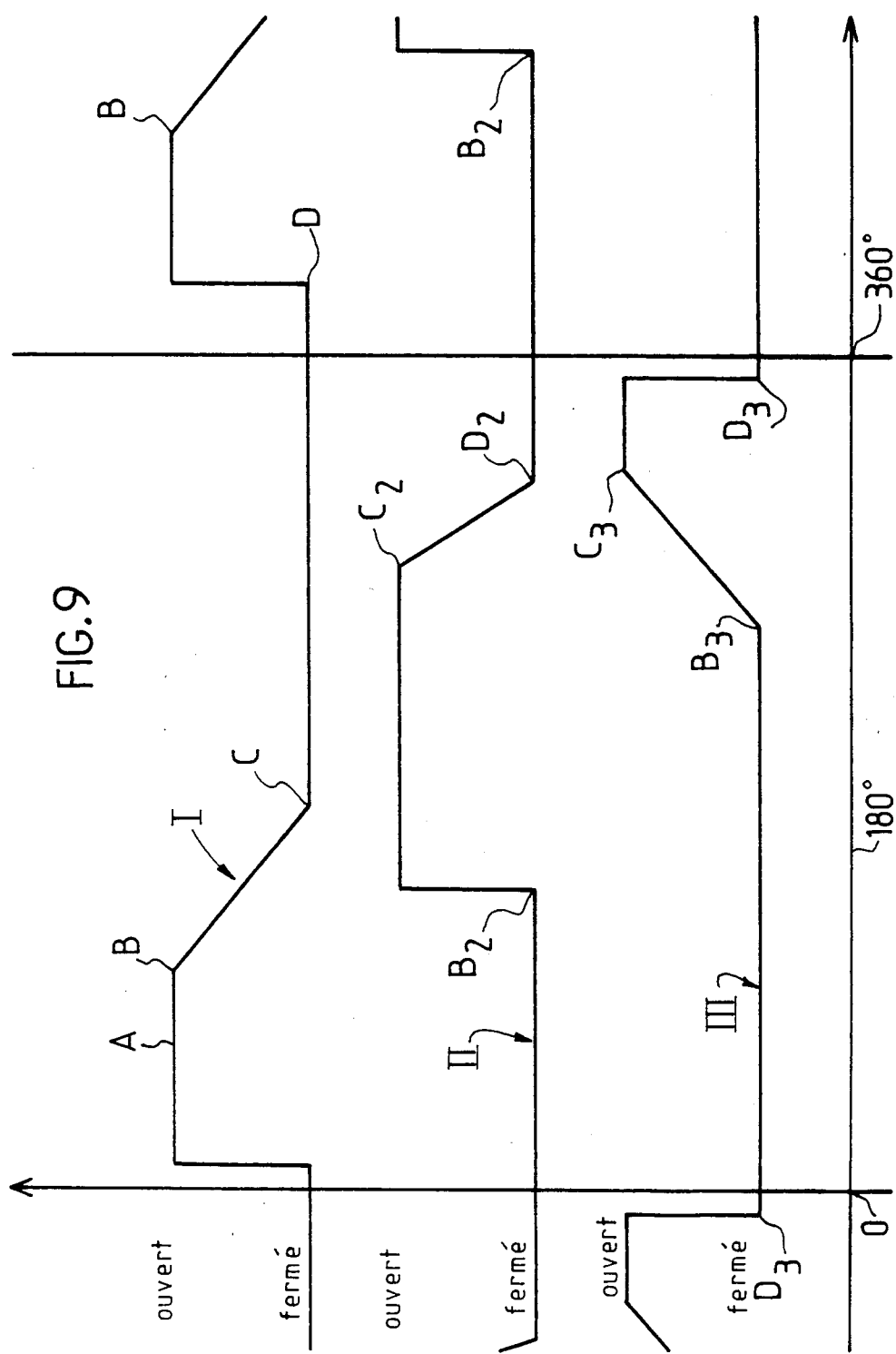

DEVICE FOR CONTROLLING DISPLACEMENT OF A MOVING MEMBER, SUCH AS A FLAP IN AN INSTALLATION FOR HEATING AND VENTILATING OR FOR AIR CONDITIONING A MOTOR VEHICLE

The invention relates to a device for controlling displacement of a moving member such as a flap in an installation for heating and ventilating, or for air conditioning a motor vehicle. The device is of the type comprising control means in the form of a slide or a rotary knob, a fluid distributor actuated by the control means and connected firstly to a source of fluid under pressure and to an exhaust, and secondly to a single-acting actuator in order to feed it with fluid under pressure, to connect it to the exhaust, or else to isolate it both from the source of fluid and from the exhaust, together with motion transmission means for transmitting motion between the piston rod of the actuator and the moving member, and between the moving member and the distributor.

BACKGROUND OF THE INVENTION

It is presently preferred practice in the motor industry to use such pressure fluid control devices instead of conventional control devices using levers and cables, because of the numerous advantages to be obtained thereby: the force exerted by the user on the control means placed on the vehicle dashboard is low and constant, the source of fluid under pressure is available from the vehicle motor system, and in the event of said source of fluid being interrupted, the moving member is automatically returned to a predetermined safety position by return means associated with the piston of the actuator for moving said moving member.

Fluid distributors already exist which are specially adapted to this use, and they comprise two elements capable of moving relative to each other in rotation or in translation, with said elements determining a plurality of fluid chambers therebetween which are separated from one another in sealed manner and which are suitable for connecting the actuator to the source of fluid under pressure, or to the exhaust, or to isolate the actuator, depending on the relative positions of the two moving elements of the distributor. In order to do this, one of the two elements is displaced by the control means provided on the dashboard, and the other element follows the stroke of the moving member in an equal or proportional manner. One of these elements is connected by a flexible hose to the actuator feed orifice, while the other element is connected via a flexible hose to the source of fluid under pressure. The displacements of these elements thus cause corresponding displacements to occur in the flexible hoses, and this may be a nuisance in the engine compartment of a motor vehicle, thereby causing the displacements of the moving elements of the distributor to be limited in order to avoid the flexible hoses tangling or becoming detached.

The aim of the invention is to mitigate these defects.

SUMMARY OF THE INVENTION

The present invention provides a control device of the above-specified type comprising a fluid distributor which is connected to an actuator and to a source of fluid under pressure via pipes which are fixed and which are therefore incapable of coming into contact with other items in the engine compartment of a motor vehicle, and which are therefore in no danger of becoming tangled or disconnected.

The present invention provides a device for controlling the displacement of a moving member such as a flap in an installation for heating and ventilating or for air conditioning a motor vehicle, the control device comprising control means including a slider or a rotary knob, a fluid distributor actuated by the control means and connected firstly to a source of fluid under pressure and to an exhaust, and secondly to a single-acting actuator in order to feed it with fluid under pressure, to connect it to the exhaust, or to isolate it both from the source of fluid and from the exhaust, motion transmission means for transmitting motion between the actuator piston rod and the moving member, and for transmitting motion between the moving member and the distributor, with the distributor including at least one first moving element which is displaced by the control means and a second moving element which is displaced by the moving member or by the actuator piston rod, the invention including the improvement whereby the distributor includes a fixed third element which cooperates with said other two elements of the distributor and which includes fluid connection means for providing fluid connections with the source of fluid, with the exhaust, and with the actuator.

The disposition of this fixed third element in the distributor provides a simple, reliable and cheap method of solving the problems of connecting the distributor to a source or fluid under pressure and to an actuator for moving the moving member.

Advantageously, the distributor is of the rotary type, and the control means and the first element of the distributor are capable of rotating through more than 360°.

Advantageously, there is no limit on the rotation of the control means and the first element of the distributor.

This avoids drawbacks related to the use of conventional controls in which rotation of a control knob is limited by end-of-stroke abutments, so that when the knob is in one extreme abutment position it must be displaced in the opposite direction over its entire stroke in order to be brought to its other extreme position. The invention makes it possible to avoid imposing any extreme position on a rotary knob, so that the knob may be free to rotate without limit.

In one embodiment of the invention, the distributor elements are stacked coaxial disks with their facing faces determining concentric annular chambers which are separated from one another in sealed manner by rubber ribs mounted on one of said faces and which are suitable for being connected to fluid passages passing through the disk constituting the first element of the distributor, with one of the chambers formed between the two moving elements of the distributor being permanently connected to the actuator via a chamber formed with the fixed third element of the distributor, regardless of the positions of the two moving distributor elements.

This disposition makes it possible to fasten the hose or pipe leading to the actuator onto the fixed element of the distributor, rather than having it fastened to one of the moving elements as was previously the case.

The disk constituting the first element of the distributor may be placed between the disks forming the second element and the third element thereof, and three concentric annular chambers may be formed between the first and second elements of the distributor in axial alignment with three other corresponding concentric annular chambers which are formed between the first element and the third element of the distributor, and which comprise a first chamber extending over 360° and connected to the actuator by a fixed fluid passage through the third element, a second chamber and a third chamber extending over less than 360° and respectively permanently connected to the source of fluid and to the exhaust via fluid passages through the third element, the chambers formed between the first and second elements comprising a first chamber extending over 360° and permanently in communication with the first chamber formed between the first and third elements via a fluid passage through the first element, and second and third chambers having different angular extents and each communicating via a fluid passage through the first element with the second or the third chamber formed between the first element and the third element, as a function of the angular position of the first element.

Further, the second element comprises, on its face facing the first element, a radial groove forming a fluid passage with one end opening out into the first chamber formed between said two elements and with its other end opening out into the second or third chamber formed between said two elements as a function of the respective angular positions of the first and second elements.

Thus, the actuator may be fed with fluid under pressure, may be connected to the exhaust, or may be isolated from both the source of fluid under pressure and the exhaust, by a fluid passage which comprises the first chamber formed between the first and third elements and the first chamber formed between the first and second elements, the radial groove formed in the second element, the second or third chamber formed between the first and second elements, and the second or third chamber formed between the first and third elements, or isolating chambers which are formed between said first and second chambers.

In order to control the displacement of n moving members, the device in accordance with the invention may comprise n three-element distributors of the above-specified type, each constituted by a stack of coaxial disks and having a common control shaft passing axially therethrough, with the shaft being constrained to rotate both with the control means and with the first element of each distributor, with the other two elements of each distributor having the shaft pass through them freely, and with the third element of each distributor being fixed and connected to an associated actuator for displacing a corresponding moving member, to the source of fluid under pressure, and to the exhaust.

Rotating a single control means can thus cause a single set of distributors to control displacement of n different moving members, with the members following different strokes which need not be simultaneous.

Advantageously, the distributors used have the same first and second elements but differ from one another in their third elements, said third elements comprising identical supports on which different linings are fixed.

Such a distributor is particularly compact and may be fitted to any insulation for heating and ventilating or for air conditioning a motor vehicle, solely by changing the number of three-element stages as a function of the number of moving members to be controlled in the installation, and by using a fixed element in each stage whose characteristics correspond to the displacement characteristics desired for the associated moving member.

BRIEF DESCRIPTION OF THE DRAWINGS

Embodiments of the invention are described by way of example with reference to the accompanying drawings, in which:

FIG. 9 is a graph showing the displacements of the three moving members controlled by the FIG. 6 distributor, with the displacements being shown as a function of rotation of a control knob.

MORE DETAILED DESCRIPTION

Figure 1:
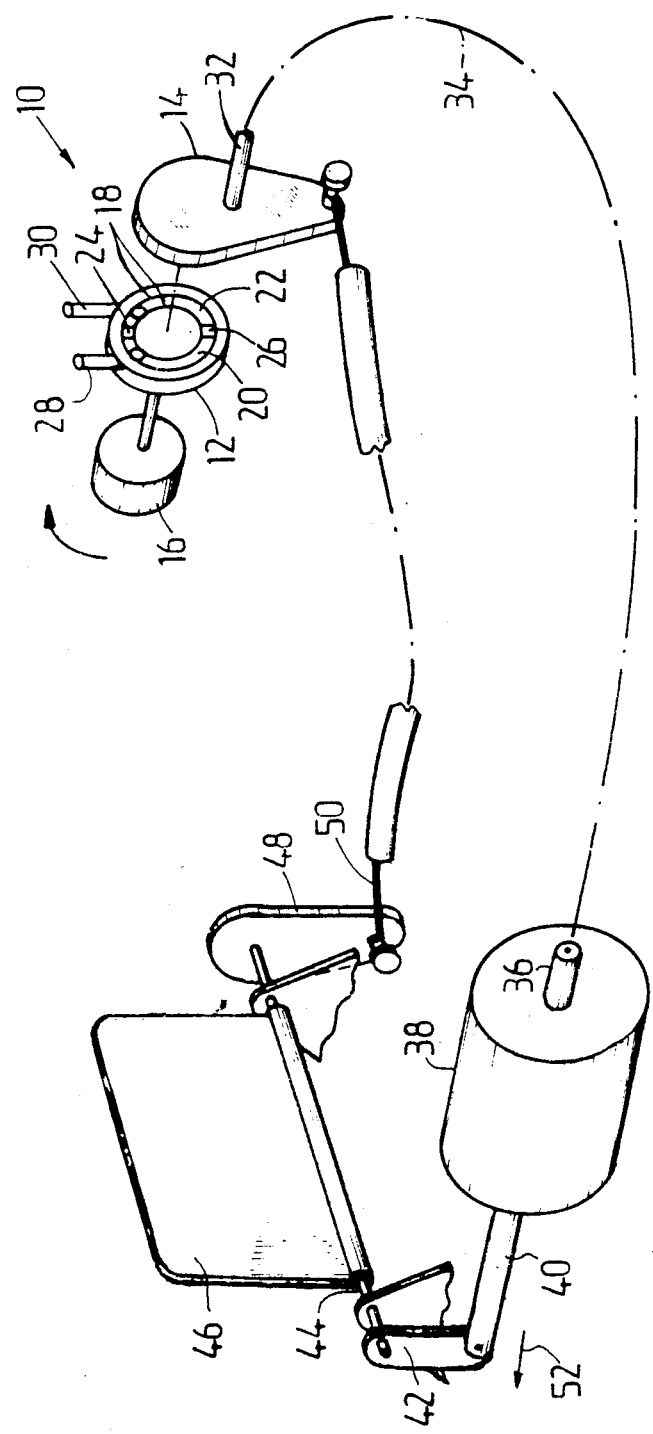
FIG. 1 is a diagram showing a prior art device for controlling the displacement of a moving member.

Reference is made initially to FIG. 1 which shows a prior art control device. This device comprises a fluid distributor 10 shown in an exploded prespective view and constituted by two coaxial disks 12 and 14 which are pressed and held against each other, in operation. This distributor is mounted behind the dashboard of a motor vehicle with the disk 12 being constrained to rotate with a control knob 16 which is rotated by a user.

The face of the element 12 which faces the other element 14 has a lining of rubber or similar elastically-deformable material providing two concentric circular ribs 18 delimiting two arcuate chambers 20 and 22 therebetween, with each arcuate chamber extending over slightly less than 180°. The arcuate chambers are separated from each other by two isolation chambers 24 and 26, each constituted by a pair of substantially adjacent radial ribs extending between the two circular ribs 18. The element 12 also includes an end fitting 28 constituting a fluid passage having one end for connection to a source of fluid under pressure via a flexible hose (not shown) and having its other end opening out in that face of the element 12 which faces the other element 14 into the chamber 20. The element 12 also has another end fitting 30 constituting an exhaust passage and having one end opening out to the atmosphere and having its other end opening out into the chamber 22.

The source of fluid under pressure is generally a source of air at reduced pressure, i.e. at a pressure of less than atmospheric pressure, and is constituted, for example, by the air intake manifold of an internal combustion engine.

The element 14 also includes an end fitting 32 having a free end connected via a flexible hose 34 to the feed orifice 36 of a singe-acting actuator 38, and having its other end opening out into that face of the element 14 which faces the other element 12, at a location which is between the concentric circular ribs 18 when the two elements are placed and held against each other.

The actuator 38 includes a piston rod 40 projecting outwardly from the end of the actuator opposite to its pressure inlet fitting 36. The far end of the piston rod 40 is connected via a crank 42 to the rotary shaft 44 of a moving member 46 such as a flap in an installation for heating and ventilating or for air conditioning a motor vehicle. The shaft 44 of the flap is also fixed to rotate a second crank 48 which is connected via a motion-transmitting cable 50 (e.g. a Bowden cable) to the element 14 of the distributor.

This prior art device operates as follows:

In the position shown, the relative angular positions of the elements 12 and 14 of the distributor are such that the end fitting 32 on the element 14 opens out into isolation chamber 26. The actuator 38 is thus isolated from the source of fluid under pressure and from the exhaust, so that the piston rod 40 and the flap 46 are motionless. When the control knob 16 is rotated in the direction of the arrow in FIG. 1 (clockwise in the figure, anti-clockwise for the user), the end fitting 32 of the element 14 opens out into the chamber 22 which is connected via end fitting 30 to the exhaust. The actuator 38 is thus connected to the exhaust and its piston rod moves outwardly in the direction shown by arrow 52, thereby rotating the flap 46. This flap rotation is transmitted by the cable 50 to the other element 14 which is thus rotated in the same direction as the element 12 until the end fitting 32 opens out once again into the insulating chamber 26. Since the actuator 38 is now isolated from the source of fluid and from the exhaust, the piston rod 40, and consequently the flap 46 stop moving.

Inversely, if the user turns the knob 16 the other way, the end fitting 32 of the element 14 will open out into the chamber 20, thereby connecting the actuator 38 to the source of fluid under pressure. As a result the piston rod 40 moves in the opposite direction to arrow 52, thereby rotating the flap 46 in the opposite direction (anti-clockwise in FIG. 1) and thus rotating the element 14 until the end fitting 32 opens out, once again, into the isolation chamber 26.

This device can thus be used to modify the angular position of the flap 46, at will, between two predetermined limit positions, merely by rotating the control knob 16 in one direction or the other, with the rotary displacement of the flap 46 being directly proportional to the rotation of the control knob 16.

However, rotation of the control knob 16 must be limited, firstly since there is no point in the knob 16 being able to rotate through a greater angle than the flap 46 which generally has extreme positions determined by fixed abutments, and secondly, if rotation of the knob 16 were not limited, the flexible hose connecting the end fitting 28 of the element 12 to the source of fluid under pressure would soon be pulled out of connection.

As indicated above, the aim of the invention is to provide a control device of this type in which the hoses connecting the distributor to the source of fluid under pressure and to the actuator are connected to an element of the distributor which is fixed, thereby avoiding moving these hoses when the control knob of the distributor is rotated, and also making it possible to rotate the control knob and the associated moving element of the distributor through several turns, thereby facilitating the control of certain installations for heating and ventilating or for air conditioning motor vehicles, in a manner described below.

Figure 2:
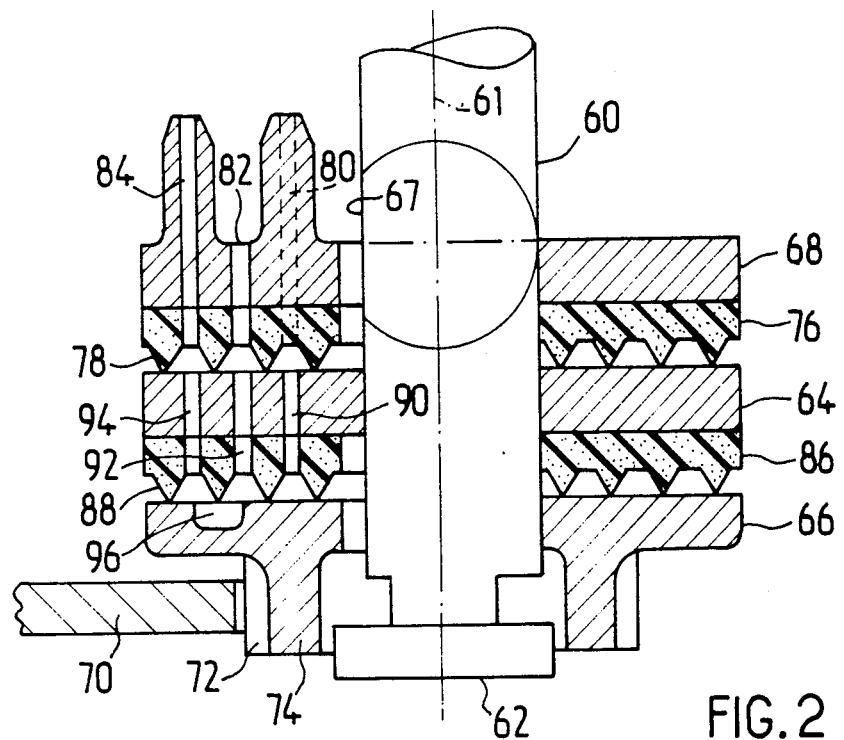
FIG. 2 is a diagrammatic axial section through a fluid distributor forming a part of a control device in accordance with the invention.

Reference is now made to FIG. 2 which is a diagrammatic axial section through a distributor in accordance with the invention.

This distributor is intended to replace the distributor 10 shown in FIG. 1, and the other elements of the control system as a whole may be left unchanged.

The FIG. 2 distributor comprises a rotary shaft 60 whose top end (as shown in the figure) is constrained to rotate with a control knob (not shown) similar to the control knob 16 shown in FIG. 1, and whose opposite end includes an abutment 62 against which the distributor is pressed, e.g. via a ball bearing, or the like.

The distributor in accordance with the invention comprises three elements constituted by a stack of coaxial disks having the shaft 60 passing axially therethrough and comprising: a first disk 64 fixed to rotate with the shaft 60, e.g. by means of a flat 67 formed on said shaft; and a second disk 66 and a third disk 68 which are placed on either side of the first disk 64 and which allow the shaft to pass freely therethrough.

The second disk 66 is connected to the moving member to be displaced by the motion transmission means, which may be constituted by a Bowden cable as shown in FIG. 1, or which may be constituted by a gearwheel 70 as shown in FIG. 2, which gearwheel meshes with teeth 72 formed on a cylindrical skirt 74 projecting from the second disk 66.

The third disk 68 is fixed so that it cannot rotate, and on its face facing the first disk 64 it has a lining 76 of elastomer or analogous elastically-deformable material being concentric ribs 78 whose tops are pressed in sealed manner against the top face of the first disk 64, thereby delimiting three annular chambers centered on the axis 61 which is common to the shaft 60 and to the disk. The disk 68 and the lining 76 have three ducts 80, 82, and 84 passing therethrough to provide fluid passages, with the duct 80 being intended for connection to the source of fluid under pressure, the duct 82 constituting an exhaust to the atmosphere, and the duct 84 being intended for connection to the feed orifice of the actuator 38.

Similarly, the disk 64 which is constrained to rotate with the shaft 60 comprises, on its face facing the disk 66, a lining 86 of elastically-deformable material shaped to have ribs 88 whose tops are pressed in sealed manner against the top face of the disk 66 in order to form therewith three annular chambers centered on the axis 61, with each of these chambers being axially aligned with one of the chambers formed between the lining 76 and the disk 64. The disk 64 and the lining 86 have three ducts 90, 92, and 94 passing therethrough parallel to the axis 61 and constituting fluid passages, each connecting one of the chambers formed between the lining 76 and the disk 64 to one of the chambers formed between the lining 86 and the disk 66.

On its top face, the disk 66 has a radial groove 96 which establishes communication between the middle chamber and the radially outer chamber formed between the lining 86 and the disk 66.

In the position shown in FIG. 2, it can be seen that the duct 84 which is connected to the actuator feed orifice communicates with the exhaust duct 82 via the radially outermost chamber formed between the lining 76 and the disk 64, via the duct 94, via the radially outermost chamber formed between the lining 86 and the disk 66, via the radial groove 96, via the intermediate chamber formed between the lining 86 and the disk 66, via the duct 92, and finally via the intermediate chamber formed between the lining 76 and the disk 64.

Figure 3:
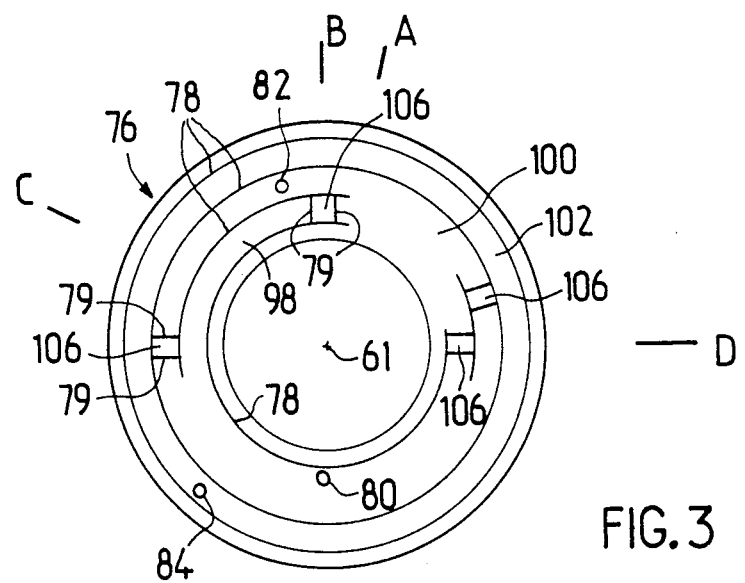
FIG. 3 is a front view of the fixed element in the FIG. 2 distributor.

Reference is now made to FIG. 3 which is a front view of the lining 76 fixed on the bottom face of the non-rotating disk 68.

The annular chambers delimited between the ribs 78 comprise a first chamber 98 which is the radially innermost chamber having the duct 80 connected to the source of fluid under pressure opening out therein, a second or intermediate chamber 100 which is directly connected to the exhaust via a gap in the two inner circular ribs 78, and a radially outermost chamber 102 having the duct 84 connected to the actuator feed orifice opening out therein. The outermost annular chamber 102 extends over a full 360°. The intermediate chamber 100 extends over a total of 180°, and has the shape shown in FIG. 3 where it can be seen that the intermediate chamber 100 and the radially innermost chamber 98 interfit by virtue of a gap extending over about 65° in the second circular rib 78 counting from the axis 61. The chambers 98 and 100 are separated from each other by isolating chambers 106 which are delimited between consecutive circular ribs 78 and pairs of radial ribs 79 with the radial ribs in each pair being separated from each other by a distance which is slightly greater than the diameter of a duct 90 or 92 formed through the first disk 64 and its lining 86.

Figure 4:
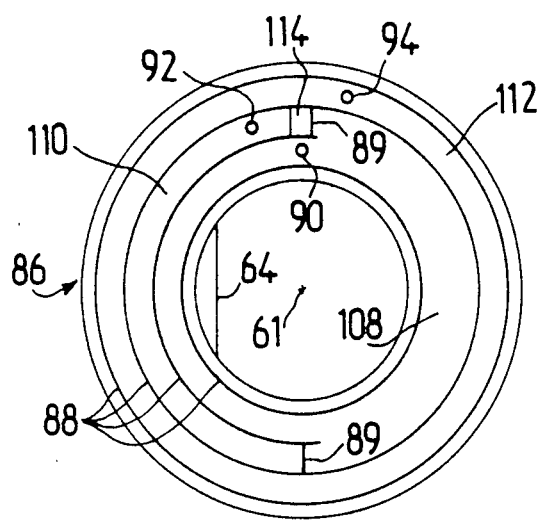
FIG. 4 is a front view of the moving element associated with the control means in the FIG. 2 distributor.

Reference is now made to FIG. 4 which is a front view of the lining 86 fixed on the bottom face of the disk 64 which is constrained to rotate with the shaft 60.

The annular chambers delimited between the ribs 88 of the lining 86 comprise: a radially innermost first chamber 108 into which the duct 90 opens out; an intermediate chamber 110 into which the duct 92 opens out; and a radially outermost chamber 112 into which the duct 94 opens out.

The outermost chamber 112 extends over a full 360°, whereas the intermediate chamber 110 extends over only 180°, with the innermost chamber 108 extending over a full 360° and also including a semi-circular portion at the same radial position as the intermediate chamber 110 by virtue of a gap extending over 180° in the second circular rib 88 counting from the axis 61. The inner chamber 108 and the intermediate chamber 110 are separated from each other by at least one isolation chamber 114 defined between two circular ribs 88 and a pair of radial ribs 89, with the radial ribs of the pair being separated from each other by a distance which is slightly greater than the width of the radial groove 96 in the disk 66.

The operation of this distributor is described with reference to FIG. 5 where the contours of the chambers formed between all three elements of the distributor are shown superposed.

Figure 5:
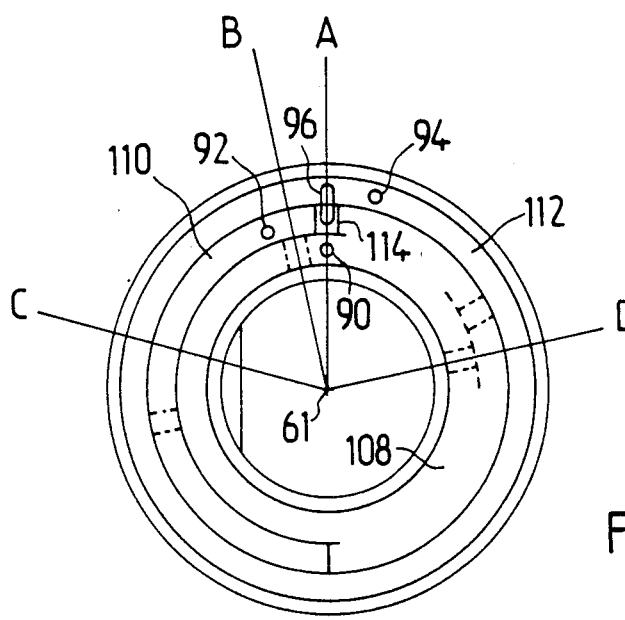
FIG. 5 is a diagram showing how the various distributor elements are superposed, in order to illustrate operation thereof.

Starting from the position shown in FIG. 5, referred to as position A, the disk 64 which rotates with the control knob is in an angular position relative to the fixed disk 68 such that its duct 90 is immediately behind (relative to an anti-clockwise direction) an isolating chamber 106 separating the exhaust chamber 100 from the chamber 98 which is connected to the source of fluid under pressure, which chambers are formed between the disk 64 and the disk 68, such that the chamber 108 and the chamber 110 formed between the disk 64 and the disk 66 are both connected to the exhaust. In this starting position, the flap 64 operated by the actuator 38 is in its fully open position corresponding to the actuator 38 being connected to the exhaust, and the radial groove 96 of the disk 66 is radially aligned with the isolating chamber 114 formed between the control disk 64 and the disk 66 which is connected to the flap 46 via the motion-transmitting system including the gear wheel 70. The chambers 112 and 102 for feeding the actuator with fluid under pressure are thus isolated from the source of fluid under pressure and from the exhaust so that the flap 46 is maintained in its fully-open position. If, under these conditions, the flap 46 should move without the user intervening on the distributor, the disk 66 will follow the movement of the flap and its radial groove will move relative to the disk 64 and leave the isolation chamber 114. Since both chambers 108 and 110 separated by said isolation chambers are connected to the exhaust, the actuator 38 will be connected to the exhaust regardless of the direction in which the flap moves, thereby returning the flap to its fully-open position.

If, starting from position A, the control knob is rotated anti-clockwise (with respect to FIG. 5) the disk 64 will turn anti-clockwise relative to the fixed disk 68 to position B where its duct 90 opens out into an insulation chamber 106 formed between the chamber 98 and 100, such that the chamber 108 is isolated from the source of fluid under pressure and from the exhaust, while the chamber 110 remains connected to the exhaust. During this movement, the radial groove 96 in the follower disk 66 will be left slightly behind the isolation chamber 114 (behind being relative to the anti-clockwise direction in which the control knob is rotated), thereby causing the chamber 112 to communicate with the chamber 118. The actuator 38 is thus isolated from the source of fluid under pressure and from the exhaust and produces no effect on the flap 46.

Thereafter, starting from position B, if the control disk 64 is further rotated anti-clockwise (relative to FIG. 5), its duct 90 will open out into the chamber 98 formed between the control disk 64 and the fixed disk 68. This chamber is connected to the source of fluid under pressure so that the chamber 108 is also connected to the source of fluid under pressure and thus feeds fluid under pressure to the chamber 112 via the radial groove 96 in the follower disk 66. The actuator is thus fed with fluid under pressure, i.e. with air at a pressure lower than atmospheric pressure in the present example, and displaces the flap 46 towards its closure position. The closure movement of the flap 46 causes the follower disk 66 to rotate anti-clockwise (in FIG. 5) until the radial groove in the disk 66 is again in communication with the isolation chamber 114 formed between said disk and the control disk 64. The flap then stops moving since the actuator 38 is isolated, when in this position, from the source of fluid under pressure and from the exhaust.

Thus, starting from position B, the angular displacement of the flap 46 is proportional to the angular displacement of the control disk 64, and thus to the angular displacement of the control knob as provided by the user.

This proportionality between the displacement of the flap and the displacement of the control knob continues up to position C which corresponds to the flap 46 being fully closed. This position is defined by an abutment which prevents the flap from moving any further, thereby immobilizing the follower disk 66 at the same time as the flap 46, with the radial groove 96 of the follower disk 66 remaining on the radius C of FIG. 5 even when the control knob continues to rotate anti-clockwise.

In position C, the duct 90 of the control disk 64 continues to open out into the chamber 98 connected to the source of fluid under pressure while the duct 92 continues to open out into the chamber 100 connected to the exhaust, however it is in the vicinity of the end of said chamber which is separated by an isolation chamber 106 from the chamber 98 connected to the source of fluid under pressure.

As the control knob continues to be rotated anti-clockwise from position C, the duct 92 of the control disk 64 will begin by opening out into the isolation chamber 106, and will then open out into the chamber 98 as will the other duct 90 in the control disk. Thus, once position C has been passed, the actuator 38 continues to be fed with reduced pressure and the flap 46 is maintained in its fully-closed position.

This state continues until position D, in which the ducts 90 and 92 of the control disk both open out into an isolating chamber 106 separating the chambers 98 and 100 formed between the control disk 64 and the fixed disk 68. In this position the actuator 38 is isolated from the source of fluid under pressure and from the exhaust, so the flap 46 remains in its fully-closed position.

If the control knob continues to be rotated in the same direction beyond position D, the two ducts 90 and 92 through the control disk 64 will open out into the chamber 100 which is connected to the exhaust. The radial groove 96 and the follower disk 66, which has remained in position C, will then put the actuator feed chamber 112 into communication with the chamber 110 which is connected to the exhaust. The actuator 38 is thus connected to the exhaust and causes the flap 46 to rotate from its fully-closed position towards its fully-open position. At the end of this movement, the radial groove of the follower disk 66 has been returned to its starting position A, in which it continues to interconnect the chambers 110 and 112, while the control disk 64 is to be found in any of the intermediate positions between positions D and A. The actuator 38 therefore remains connected to the exhaust, and the flap 46 is held in its fully-open position. This continues until the control disk 64 is brought to position B by further rotation in an anti-clockwise direction (with reference to FIG. 5).

The angular displacement of the flap 46, which may be a defrosting control flap, for example, is represented by the top curve I in FIG. 9 as a function of the angular position of the distributor control knob.

It can be seen that for curve I, the flap is open when the control knob or the control disk 64 is in position B, that the flap closes progressively as the control knob moves from position B to position C, and that it remains closed for the control knob moving from position C up to position D, whereupon it opens fully as soon as the control knob moves past position D and then remains fully open until the control knob returns to position B.

The distributor in accordance with the invention thus makes it possible to provide a control knob whose angular position is not limited so that the user can continue to rotate it in the same direction, if so desired, without any risk of the hoses connecting the distributor to the source of fluid under pressure and to the flap actuator becoming tangled or disconnected.

The invention can also be used to provide a compact distributor enabling a plurality of flaps to be controlled by means of a single control knob, with the movements of the flaps being independent, i.e. there is no need for the flap movements to be identical or simultaneous.

Figure 6:
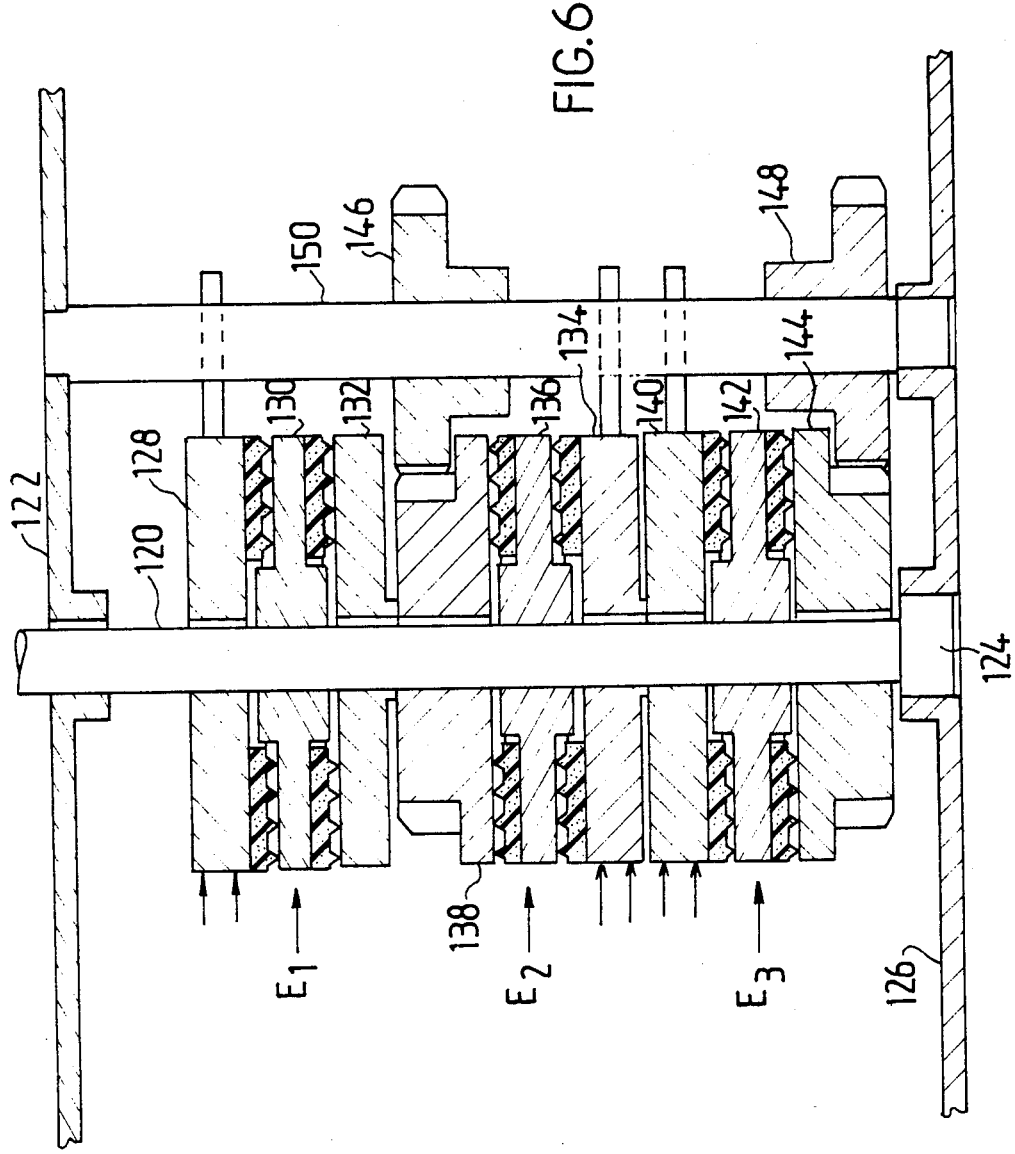
FIG. 6 is a diagrammatic axial section through another distributor in accordance with the invention and suitable for controlling the displacement of three different moving members.

Reference is now made to FIG. 6 which is a diagrammatic axial section through a distributor in accordance with the invention for controlling three flaps, for example a defrosting control flap, a side ventilation control flap, and a foot ventilation control flap for use in a motor vehicle cabin.

The FIG. 6 distributor comprises a rotary shaft 120 having one end passing through the front wall 122 of a dashboard and fixed to rotate with a control knob (not shown). The opposite end of the shaft 120 is supported and guided by a bearing 124 mounted on a rear wall 126 of the dashboard.

The distributor comprises three stages superposed along the axis of the shaft 120, with each stage being constituted by a distributor of the type shown in FIG. 2. The first stage E1 comprises a fixed disk 128, a control disk 130 constrained to rotate with the shaft 120, and a follower disk 132. The bottom face of the fixed disk 128 has a lining of elastically-deformable material with ribs that co-operate with the top face of the control disk 130, and the bottom face of the control disk 130 also has a lining of elastically-deformable material having ribs which co-operate with the top face of the follower disk 132, as in the FIG. 2 distributor.

The second stage E2 comprises a fixed disk 134, a control disk 136 constrained to rotate with the shaft 120, and a follower disk 138. The stage E2 has the same general structure as stage E1, but it is mounted the other way up, with the follower disk 138 being adjacent to the follower disk 132 of the stage E1.

The stage E3 likewise comprises a fixed disk 140, a control disk 142 constrained to rotate with the shaft 120 and a follower disk 144, and it is mounted the same way up as the stage E1.

Each of the fixed disks 128, 134, and 144 comprises two fluid-passing ducts for connection to the source of fluid under pressure and to the feed orifice of the actuator, and these ducts open out radially in the periphery of the corresponding disk, as shown diagrammatically in FIG. 6 by means of arrows. Each fixed disk 128, 134, and 140 may include a radial fork for engaging a shaft 150, thereby preventing the fixed disk in question from rotating about the shaft 120.

Each of the follower disks 132, 138, and 144 is connected via motion transmission means to the corresponding flap, i.e. to the defrosting control flap, to the foot heating control flap, and to the side demisting control flap respectively, with the motion transmission means being constituted by a lever and cable system as shown in FIG. 1, by a cable system, or by a lever and gear wheel system as shown in FIG. 2.

In FIG. 6, the follower disk 138 meshes with a gearwheel 146 and the follower disk 144 meshes with a gearwheel 148, both of which gearwheels are freely mounted in rotation on a common shaft 150 extending parallel to the shaft 120 and supported at its ends by the front and rear faces 122 and 126 of the dashboard. The follower disk 132 of the first stage E1 may be connected to the associated flap by a gearwheel, or by any other suitable means.

In the FIG. 6 distributor, the control disks 130, 136, and 142 are identical as are the follower disks 132, 138, and 144. The differences between the three stages of the distributor are defined by the linings of the fixed disks 128, 134 and 140, with one of these disks being as shown in FIG. 3, for example, while the other two fixed disks 134 and 140 have linings as shown in FIGS. 7 and 8 respectively.

Figure 7:
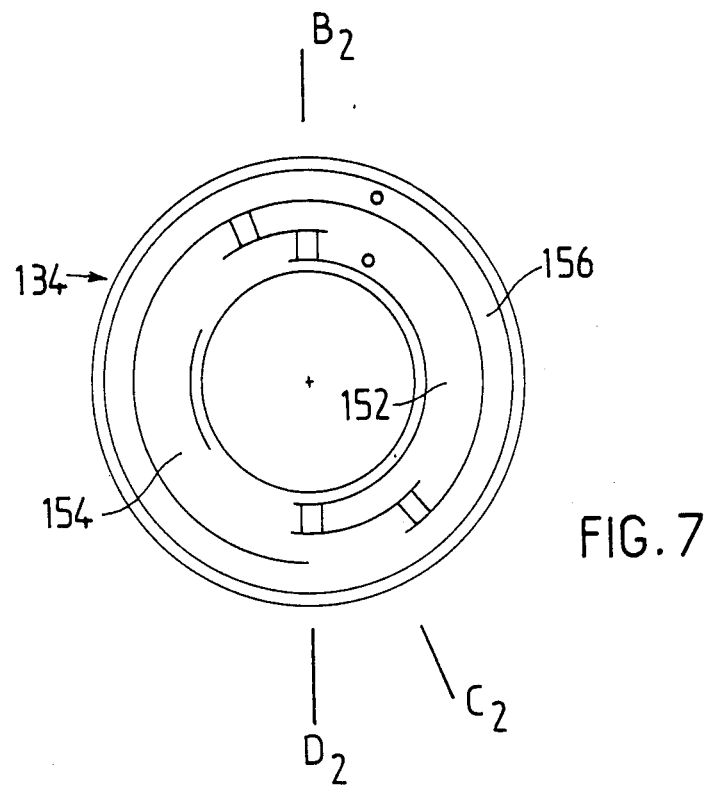
FIG. 7 is a front view of one of the moving elements in the FIG. 6 distributor.
Figure 8:
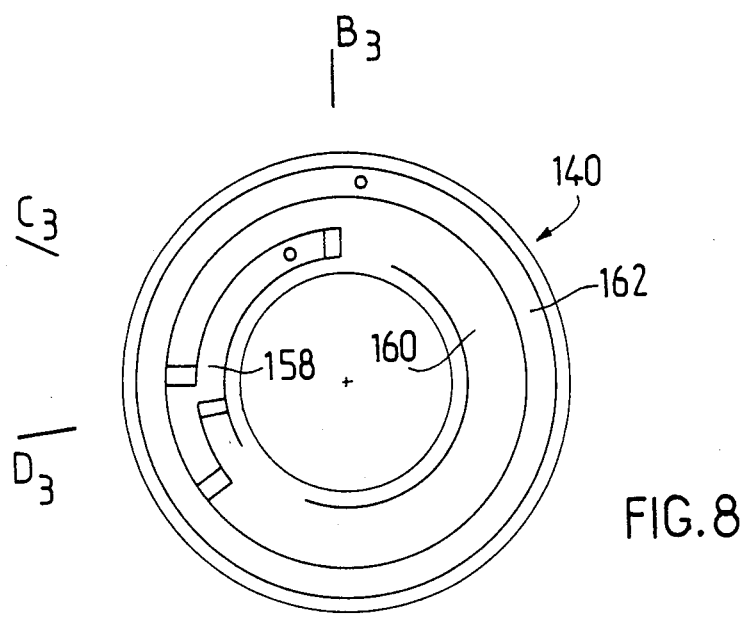
FIG. 8 is a front view of another moving element in the FIG. 6 distributor.

The ribs on the lining of the disk 134 as shown in FIG. 7 delimit a first substantially semi-circular chamber 152 which is connected to the source of fluid under pressure, a second substantially semi-circular chamber 154 connected to the exhaust, and a third fully annular chamber 156 connected to the feed orifice of the actuator for controlling the foot ventilation flap.

In stage E2 of the distributor, the fixed disk 134 cooperates with the control disk as shown in FIG. 4, and the control disk co-operates, in turn, with a follower disk as shown in FIG. 2. The stage E2 of the distributor thus operates as follows, assuming that the flap associated with this distributor is closed when its actuator is connected to the exhaust.

The angular position of the control disk relative to the fixed disk 134 may be defined by the angular position B2, C2 and D2 shown in FIG. 7. Supposing that the control disk moves clockwise relative to the fixed disk 134 as shown in FIG. 7, it can be seen that the actuator is fed with fluid under pressure after leaving position B2, thereby causing the corresponding flap to take up its fully-open position and to remain in said fully-open position until the position C2 is reached. From position C2 to position D2, the flap closes progressively, with its angular displacement being proportional to the angular displacement of the control disk. From position D2 to position B2 the actuator remains connected to the exhaust, so the flap is maintained in its fully-closed position.

The fixed disk 140 of stage E3 is shown in FIG. 8, and has ribs on its lining defining a first chamber 158 which is connected to the source of fluid under pressure, a second chamber 160 connected to the exhaust, and a third chamber 162 which extends annularly and continuously over 360°, which is connected to the feed orifice of the actuator for the associated flap.

As for stages E1 and E2, the fixed disk 140 of the stage E3 is associated with a control disk such as that shown in FIG. 4 and a follower disk such as that shown in FIG. 2.

This stage operates as follows, assuming that the associated flap is closed when its actuator is connected to the exhaust.

The radial position of the control disk is defined relative to the fixed disk 140 by the radial positions B3, C3 and D3 of its isolation chamber 114, and it can be seen that the flap passes progresively from its closure position to its open position while the control disk moves from position B3 to position C3, with the angular displacement of the flap then being proportional to the angular displacement of the control disk, that the flap remains open while the control disk passes from position C3 to position D3, and that the flap moves to its fully closed position as soon as the control disk moves past position D3, with the flap remaining fully closed as the control disk continues to move anti-clockwise from position D3 to position B3.

The displacements of the flaps controlled by stages E2 and E3 of the distributor are shown by curves II and III respectively in FIG. 9, as a function of the angular positions of the associated control disks.

It can be seen from FIG. 9 that the FIG. 6 distributor enables a single rotatable control knob to pass successively through a position of maximum defrosting while side demisting and foot heating are closed, followed by progressive reduction in the defrosting ventilation accompanied by maximum foot heating and no side demisting, followed by substantially no defrosting in conjunction with maximum foot heating and progressively increasing side demisting, and finally no defrosting, no foot heating, and maximum side demisting, before returning to its position of maximum defrosting, with no side demisting or foot heating.

The user can turn the control knob in either direction as desired, without ever encountering an abutment, and therefore without ever needing to return backwardly to obtain the desired type of ventilation.

In addition, the motion transmission means connecting either the piston rods of the actuators to the associated flaps, or else connecting the flaps to the corresponding follower elements of the distributor enable each flap to be displaced over a desired angular displacement between limiting positions for a given angular displacement of the control knob and a given predetermined stroke of the actuator piston rod, with these various displacements being matched by a suitable selection of crank arm lengths and/or transmission gear ratios in the means for transmitting motion between the actuators and the flaps and between the flaps and the follower elements of the distributor.

I claim:

1. A device for controlling displacement of a moving member such as a flap in an installation for heating and ventilating or for air conditioning a motor vehicle, the device comprising slider or rotary knob control means, a fluid distributor actuated by the control means and connected firstly to a source of fluid under pressure and to an exhaust, and secondly to a single-acting actuator in order to connect said actuator to the source of fluid under pressure, to the exhaust, or to isolate it both from the source of fluid under pressure and from the exhaust, motion transmission means for transmitting motion between the actuator, the moving member, and the distributor, said distributor including at least one moving first element displaced by the control means, at least one moving second element displaced by the moving member or by the actuator, and including the improvement whereby it includes at least one fixed third element co-operating with said first and second elements and including means on said third element for providing fluid connection with the source of fluid under pressure, with the exhaust, and with the actuator to provide selective fluid communication between the fluid distributor and the source of fluid under pressure, the exhaust, and the actuator.

2. A device according to claim 1, wherein the distributor is of the rotary type, and wherein the control means and the moving first element of the distributor are continuously rotatable through more than 360°.

3. A device according to claim 2, wherein the rotation of the control means and of the moving first element of the distributor is infinite.

4. A device according to claim 2, wherein the angular displacement of the second element of the distributor is equal or proportional to the stroke of the moving member.

5. A device according to claim 1, wherein the distributor elements are stacked coaxial disks, defining concentric angular chambers between their facing faces, said chambers being separated from one another in sealed manner by ribs made of rubber or like material mounted on one face of each pair of facing faces and suitable for being connected to fluid passages passing through the moving first element of the distributor, one of said chambers formed between the two moving elements of the distributor being permanently connected to the actuator via a chamber formed between the first and third elements of the distributor, regardless of the positions of the two moving elements of the distributor.

6. A device according to claim 5, wherein the disk constituting the first element of the distributor is placed between the disks constituting the second and third elements thereof, and wherein three concentric annular chambers are formed between the first and second elements of the distributor, said chambers being axially aligned with three other corresponding concentric annular chambers formed between the first and the third elements of the distributor, said other annular chambers comprising a first chamber extending 360° between the first and third elements and connected to the actuator via a fixed fluid passage through the third element, and a second chamber and a third chamber each extending less than 360° and permanently connected respectively to the source of fluid under pressure and to the exhaust via fluid passages passing through the third element, the chambers formed between the first and second elements comprising a first chamber extending 360° and in permanent communication with the first chamber formed between the first and third elements via a fluid passage through the first element, and a second chamber and a third chamber extending over different angular extents and each communicating via a respective fluid passage through the first element with the second chamber and the third chamber formed between the first and third elements as a function of the angular position of the first element of the distributor.

7. A device according to claim 6, wherein the second element of the distributor has a fluid-passing radial groove in its face facing the first element, one end of said groove opening out into the first chamber formed between said two elements, and the other end of the groove opening out into the second or the third chamber formed between said two elements as a function of the relative angular positions of the first and second elements of the distributor.

8. A device according to claim 7, wherein isolating chambers are formed between said second and third chambers.

9. A device according to claim 6, wherein isolating chambers are formed between said second and third chambers.

10. A device for controlling the displacement of a plurality n of moving members, said device comprising n three-element distributors as claimed in claim 1, said device being constituted by a stack of coaxial disks having a control shaft passing axially therethrough, with said control shaft being constrained to rotate firstly with the control means and secondly with the first element of each three-element distributor, said shaft passing freely through the other two elements of each distributor, with the third element of each distributor being fixed so as not to rotate and being connected to the actuator for displacing the associated moving member, to the source of fluid under pressure, and to the exhaust.

11. A device according to claim 10, wherein said distributors have identical first and second elements, and differ solely in their third elements.

* * * * *